United States Patent [19]

Holford

[11] 4,053,887

[45] Oct. 11, 1977

[54] DOPPLER RADAR SYSTEM

[75] Inventor: Kenneth Holford, Crawley, England

[73] Assignee: U.S. Philips Corporation, New York, N.Y.

[21] Appl. No.: 631,382

[22] Filed: Nov. 12, 1975

[30] Foreign Application Priority Data

Nov. 29, 1974 United Kingdom ............... 51762/74

[51] Int. Cl.² ............................................... G01S 9/44
[52] U.S. Cl. ..................................... 343/9; 343/7 YC
[58] Field of Search ...................................... 343/7.7, 9

[56] References Cited

U.S. PATENT DOCUMENTS 3,832,709  8/1974  Klein et al. ........................... 343/9 X
3,845,461 10/1974  Foreman ........................... 343/7.7 X
3,896,436  7/1975  Johnson ............................... 343/9 X Primary Examiner—T.H. Tubbesing
Attorney, Agent, or Firm—Frank R. Trifari

[57] ABSTRACT

A Doppler radar system for controlling portable traffic signals in response to on-coming traffic. Each of two channel amplifiers of the system is fixed at high gain and passes both noise signals and Doppler signals to a phase detector. A threshold element provides a control signal when the average level of the phase detector output between high and low levels changes sufficiently, due to the presence of Doppler signals, from a mean level which is due to noise alone.

9 Claims, 6 Drawing Figures

DOPPLER RADAR SYSTEM

This invention relates to Doppler radar systems of the character comprising, a transmitter for transmitting a signal, a receiver for receiving a Doppler-shifted echo signal from a moving target, and first and second mixer stages each for mixing the echo signal with a portion of the transmitted signal to produce first and second beat signals, respectively, said echo signal and/or said portion of the transmitted signal being phase delayed in the second mixer relative to the first mixer so that said second beat signal, although having the same frequency as the first, is phase-shifted with respect thereto.

In a Doppler radar system of the above character, the frequency of either beat signal can be measured to provide an indication of the speed of a moving target relative to the system. If mere moving target presence, rather than actual target speed, is to be indicated by the system, as may be the case for an intruder alarm application of the system, then just the detection of either beat signal would suffice to provide such as indication without frequency measurement being necessary. However, a principal reason for producing the two identical but relatively phase-shifted beat signals in a system of the above character is to utilise these signals by means of a phase detector to determine direction of movement (either receding or approaching) of a target with respect to the system. One example of this utilisation is known from U.K. Pat. specification No. 1,289,496. Another is known from out U.K. Pat. specification No. 1,357,457 (PHB.32241 DIV).

In our U.K. Pat. specification No. 1,357,456 there is disclosed a system of the above character in which the two relatively phase-shifted beat signals are utilised in an arrangement which, in the presence of noise that could affect the beat signals sufficiently to give rise to a false speed indication, inhibits target speed indicating means to prevent such a false speed indication being given.

The present invention is also concerned with overcoming the effects of noise in a Doppler radar system of the above character, and aims at providing such a system which has a high degree of sensitivity and security against false alarms despite the presence of noise in the system.

According to the present invention thee is provided a Doppler radar system of the character referred to, wherein there is included a phase detector responsive during each beat signal cycle to produce an output signal having a first level when the two beat signals have a relative phasing within specified limits and a second level when their relative phasing has shifted outside these limits, respective amplifying means to which said beat signals are applied before application to said phase detector, said amplifying means having a gain sufficient to produce, in the absence of said beat signals, output (noise) signals which are due to noise in the system and which render the phase detector responsive in accordance with the relative positions of their rising and falling edges to produce its output signal with either said first or second level, storage means responsive to the phase detector output signal for storing a representative level thereof, and threshold means responsive to provide an indication of a moving target when said representative level of output signal changes from a quiescent value to a threshold value.

The invention is based on the premise that noise in each of the two beat signal channels is largely uncorrelated in respect of one to the other. Therefore, the phase detector output signal due to noise signals from the amplifying means will be noise-like and on average will be at one level half the time and at the other level half the time. If this average of the phase detector output signal changes because one level or the other predominates, this is an indication that something more than just noise is present in the output signals from the amplifying means to the phase detector; that is, it is an indication that related fixed phase beat signals are present as well as noise. The average level of the output signal from the phase detector, or the average time that this output signal is at one or the other of its two levels will be "weighted" if, prior to being applied to the phase detector, the output signals from the amplifying means are passed through a non-linear circuit element which causes their mean or average level to be different from the level which is midway between their most positive and most negative swings. For example, the non-linear circuit element can clip either the positive or the negative swing, or can effect clipping of both swings unequally.

In carrying out the invention, the storage means can be simple RC-network comprising a resistance through which a capacitance is arranged to be charged and discharged according as the output signal from the phase detector is at one or other of its two possible levels, so that the capacitance acquires a resultant charge which corresponds to the average level of this output signal, this average level constituting said representative level.

Alternatively, the storage means can comprise a capacitance and a transistor (or other unidirectional current path means) permitting the capacitance to be discharged at a relatively high rate when the phase detector output signal is at one of its two possible levels, together with a resistance which provides for the capacitance a charge path through which, when the phase detector output signal is at its other level, said transistor permits the capacitance to acquire charge at a relatively slower rate, the resultant average charge on the capacitance corresponding to said one level which constitutes said representative level.

With each of these forms of storage means, the values of the resistance and capacitance are chosen to provide a time constant which determines a period that is longer than the expected time of noise-to-noise correlation as will occur from time to time due to the random nature of the noise. As a result, the switching due to noise between the levels of the phase detector output signal will occur within this predetermined period and will thus be mostly too frequent for the change in the representative level of the output signal to be sufficient to take it from the quiescent value to the threshold value. When one or the other of the output signal levels is prolonged beyond this predetermined period due to the presence of a beat signal (as well as noise), the value of the representative level will reach the threshold value to cause the threshold means to become responsive.

From the foregoing, it will be appreciated that the values of the resistance and capacitance are chosen as a compromise between an acceptable speed of response in detecting target movement and an acceptable degree of immunity to noise or short period Doppler signals. Noise immunity is improved as the predetermined period is made longer, but at the expense of a longer time to respond, which increases as this period increases.

In the case of the first form of storage means, restoration of the representative level of the output signal towards the quiescent value, following a change in the output signal level, is at substantially the same rate in each direction. In the case of the alternative form of storage means, this restoration, which effectively is in one direction only, is at a higher rate than the rate of departure of the representative level from the quiescent value. This means that following a change to the output signal level which permits the capacitance to acquire charge, but which does not stay coherent sufficiently long for the representative level of the output signal to attain the threshold value, a change to the other output signal level, which causes the capacitance to discharge rapidly, will cause the charge on the capacitance to return rapidly to the quiescent value of the representative level. Because of this rapid recovery, each change in the output signal level towards the threshold level, but which does not reach it, is cancelled quickly afterwards and each new such attempt to reach the threshold level is in effect "looked at" without much history from previous such excursions.

It is to be understood that the references herein to capacitance "charge" and "discharge" can be interchangeable in accordance with conventional circuit practice, depending on the circuit polarities used.

For the first form of storage and threshold means, the threshold means can be comprised by a differential transistor pair of which one transistor has its base connected to receive a reference voltage corresponding to said threshold value, while the other transistor has its base connected to receive the voltage across said capacitance due to the charge thereon, the conductive states of these two transistors being altered to provide an output signal indicative of target movement when the voltage across the capacitance has a value signifying said threshold value.

For the alternative form of storage and threshold means, the threshold means can be comprised by a transistor having its emitter connected to receive a reference voltage corresponding to said quiescent value, and its base connected to receive the voltage across said capacitance due to the charge thereon, the transistor being rendered either conductive or non-conductive to provide an output signal indicative of target movement when the voltage across the capacitance has a value signifying said threshold value.

Preferably, the two beat signals have a nominal 90° phase relationship and the phase detector means has a clock input to which one of said amplifier output signals is applied and a second input to which the other of said amplifier output signals is applied, the phase detector means being so arranged that each time the amplifier output signal at its clock input attains a triggering level, it produces an output signal having either said first level or said second level according as the amplifier output signal at its second input has an upper or lower level and maintain that output signal level until the amplifier output signal at its clock input next attains said triggering level, which next triggering level will cause the output signal level to change only if there is now a change in the level of the amplifier output signal at said second input.

The phase detector means is suitably a D-type edge-triggered flip-flop having a clock input, a D input, which is said second input, and complementary Q and Q outputs. Both outputs are switchable between "high" and "low" signal levels, so that either output can be used for the purposes of the invention.

In order that the invention may be more fully understood, reference will now be made, by way of example, to the accompanying drawings of which:

Figure 1:
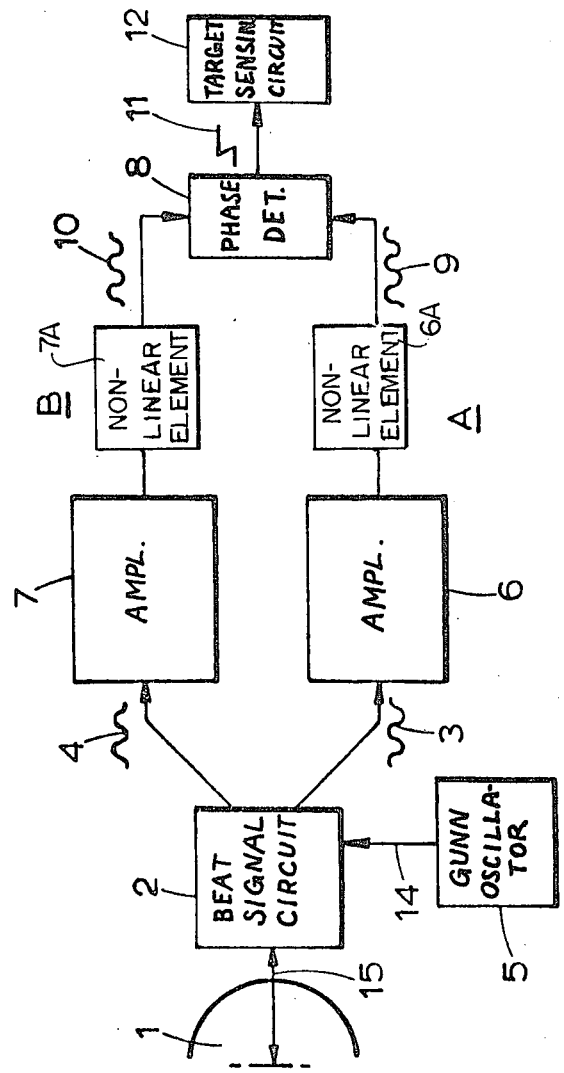
FIG. 1 is a block diagram of a Doppler radar system embodying the invention.

Referring to FIG. 1, the radar system there shown has an aerial 1 and a microwave circuit 2 which is of any suitable known from appropriate for producing two beat signals 3 and 4 in phase quadrature. A microwave source of energy 5, which is suitably a Gunn oscillator, provides microwave power for the system. The two beat signals 3 and 4 are fed in separate channels A and B to respective high gain amplifiers 6 and 7. The system further comprises a phase detector 8 to respective inputs of which amplifier output signals 9 and 10 are applied. Non-linear circuit elements 6A and 7A as described above, may be interposed between respective amplifiers 6 and 7 and the phase detector 8. The purpose of the phase detector 8 is to detect the relative phase of the amplifier output signals 9 and 10 applied to its two inputs to produce an output signal 11 which has one level (high) when the relative phasing of the signals 9 and 10 is within a ± 90° range, and a second level (low) when the relative phasing has shifted outside this range. The output signal 11 is applied to a target sensing circuit 12 which is responsive thereto, in a manner to be described, to detect the presence of a moving target.

Figure 2:
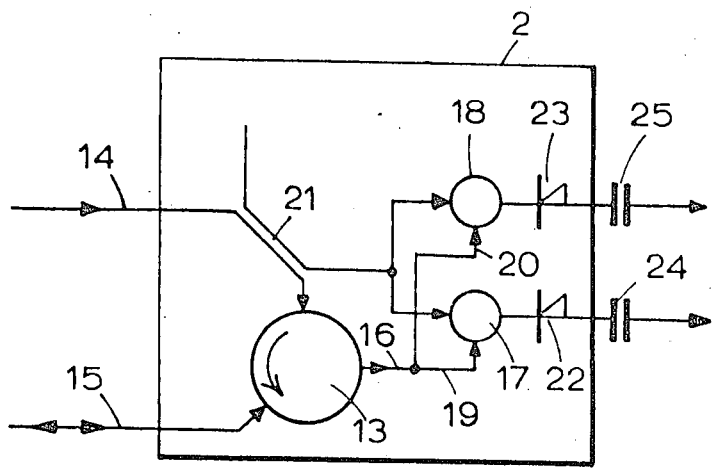
FIG. 2 shows diagrammatically one form of microwave circuit for the system of FIG. 1.

The microwave circuit 2 can be of the form shown in FIG. 2, this microwave circuit including a circulator 13 which enables the use of a single aerial for both transmission and reception. Microwave power from the Gunn oscillator 5 is applied to port 14 and flows to the aerial via a port 15. Power received at port 15 from the aerial 1 (i.e. a Doppler-shifted echo signal from a target) is routed via a port 16 to two hybrid rings 17 and 18 via respective paths 19 and 20 which are of different lengths such that the echo signal at hybrid ring 18 is delayed by 90° with respect to the echo signal at hybrid ring 17. The microwave circuit also includes a coupler 21 which applies a portion of the microwave power at port 14 to the two hybrid rings 17 and 18. In each of the two hybrid rings 17 and 18 the instantaneous amplitudes of the two signals applied thereto are added together to produce a sum amplitude signal and respective mixer diodes 22 and 23 detect instantaneous amplitude variations of this sum amplitude signal and produce a direct output voltage which varies in amplitude in accordance with those amplitude variations which are caused by the changing phase relationship between the two mixing signals.

This variation in phase relationship is due to target movement (either approaching or receding) in that if a target is approaching the system there will be an apparent increase in the frequency of the echo signal relative to the transmitted signal, whereas if a target is receding from the system there will be an apparent decrease in the frequency of the echo signal relative to the transmitted signal. More specifically, when a target is approaching the system and reaches a position for which the amplitudes of the two signals applied to the hybrid ring 17 sum to a maximum, the maximum of the sum of the amplitudes of the two signals applied to the hybrid ring 18 is about to occur a little later in time when the path length for the Doppler-shifted echo signal has shortened by another quarter wavelength. In other words, the amplitude modulation of the sum signal from the hybrid ring 18 lags that from hybrid ring 17 by a quarter wavelength (90°), of detected Doppler frequency where the wavelength is being measured at microwave frequency. Conversely, it will be apparent that when a target is receding from the system, the amplitude modulation of the sum signal from the hybrid ring 18 leads that from the hybrid ring 17 by a quarter wavelength.

By applying the varying direct output voltages from the two mixer diodes 22 and 23 to respective capacitors 24 and 25, there are obtained two identical beat (or Doppler) signals which are being produced at audio frequency and which are nominally 90° phase spaced, but which alter in their relative phasing according as a target is approaching the system or is receding from it. These phase relationships of the two beat signals are shown in FIG. 3 in which wave A represents the beat signal in channel A, wave $Ba$ represents the beat signal in channel B for an approaching target, and wave $Br$ represents the beat signal in channel B for a receding target.

Figure 3:
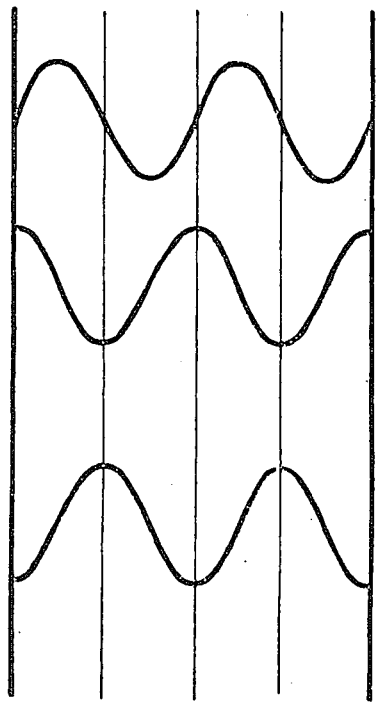
FIG. 3 illustrates the beat signal obtained from the microwave circuit.

From the waveforms in FIG. 3, it can be seen that when wave A is crossing zero, in say the positive-going direction the sign of the wave B (i.e. $Ba$ or $Br$) indicates the direction of target movement. Furthermore, since the zero crossing of wave B is nominally situated in the middle of wave A (i.e. where A has a maximum amplitude), maximum relative phase displacement of the waves A and B due to circuit inaccuracies is possible before any circuit logic that determines the target direction sense from these waves can give a wrong answer. Thus, the beat signal in one channel, say channel A, can be considered as a reference with the other beat signal (in channel B) being allowed, in effect, to wander in phase relative to it. The relative phase wanders outside the ± 90° range when there is a change in target direction.

Figure 4:
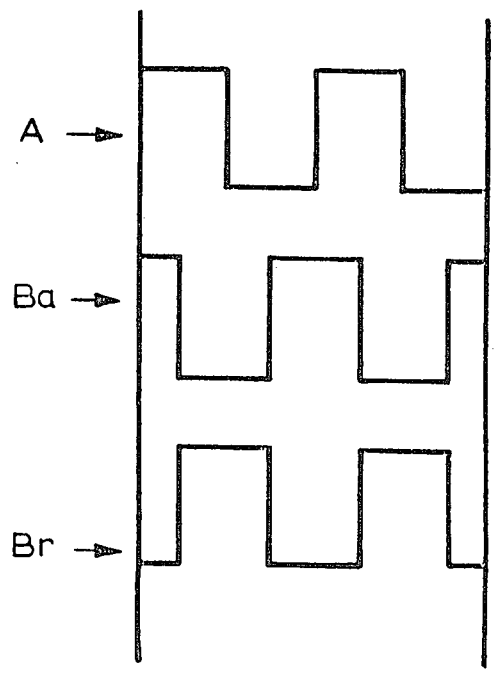
FIG. 4 illustrates the beat signals after amplification and clipping to cause them to move between predetermined voltage levels.

It is convenient to amplify and clip the beat signals to produce rectangular waves as illustrated in FIG. 4.

However, noise in the system can alter the positions of the zero crossings of the two beat signals, cause additional crossings, and also produce an output in the absence of the beat signals. Therefore, unless some measure is taken to overcome the presence of noise in the system, false target indications may be produced.

In accordance with the present invention noise in the system is averaged out, for the reasons explained previously. To achieve this, the amplifiers 6 and 7 have a gain sufficient to produce, in the absence of the beat signals 3 and 4, their output signals 9 and 10 which are due to noise in the system. The phase detector 8 detects the relative positions of the rising and falling edges of these noise signals to produce the output signal 11 which will be switching between its high and low levels under the effects of noise.

Figure 5:
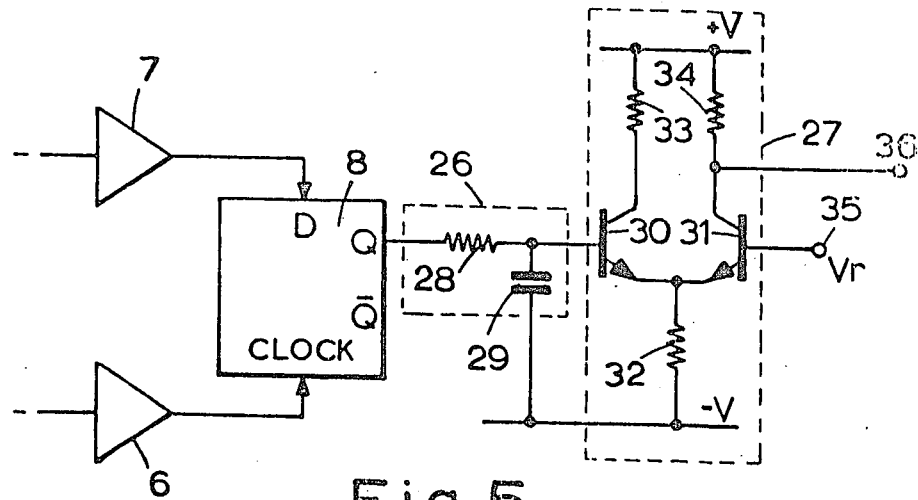
FIG. 5 is a simplified circuit diagram of one form of target sensing circuit for the system of FIG. 1.

Turning now to FIG. 5, the target sensing circuit there shown comprises a storage element 26 and a threshold element 27. The element 26 comprises a resistor 28 which is fed with the phase detector output signal 11 to charge and discharge a capacitor 29. When the output signal 11 has a high level the capacitor 29 acquires charge and when the output signal 11 has a low level the capacitor 29 loses charge. As a result, the resultant charge on the capacitor 29 varies about a representative level which signifies the average level of the output signal 11. The amount of variation is determined by the RC time constant of resistor 28 and capacitor 29, this time constant being chosen, as previously explained, having regard to the expected noise-to-noise correlation time in the system. Thus, in the absence of the beat signals 3 and 4, this average level has a quiescent value which is due to noise and which, although varying, is unlikely to change sufficiently to reach a threshold value at which the threshold element 27 becomes responsive if the time constant of resistor 28 and capacitor 29 has been correctly chosen. When the beat signals 3 and 4 occur, they will contribute to the changes in the relative phases of the amplifier output signals with the result that the average (representative) level of the output signal 11 will either increase or decrease according to the relative phases of the beat signals 3 and 4. Thus, the resultant charge on the capacitor 29 will either increase or decrease and, correspondingly, so will the voltage across the capacitor due to the charge thereon.

The threshold element 27 comprises two transistors 30 and 31 connected as a differential transistor pair between supply voltage lines +V/−V via a common emitter resistor 32 and respective collector resistors 33 and 34. The base of the transistor 30 is connected to the capacitor 29 and that of the transistor 31 is connected to a reference voltage terminal 35. A reference voltage $Vr$ at terminal 35 sets a threshold level at which transistor 30 can be normally conductive and transistor 31 normally non-conductive when the charge across the capacitor 29 is due to the average level of the output signal 11 being at the quiescent value. If the average level of the output signal 11 decreases to the threshold value, the decreased voltage across the capacitor 29 due to the decreased charge thereon will render transistor 31 conductive. Such a decrease in the average level of the output signal 11 would be due to change in the average relative phases of the beat signals 3 and 4 in response to a target approaching the system, and the change in the voltage at the collector of transistor 31 would appear at an output terminal 36 to signify the detection of the approaching target.

A specific contemplated application of the system being described is in the control of traffic signals in response to approaching vehicles. In this application, vehicles moving away from the traffic signals must not cause the system to respond to indicate a target movement; and would not, because in response to a receding target the relative phases of the beat signals 3 and 4 would be such as to cause the average level of the output signal 11 to increase away from the threshold value, so that the voltage across the capacitor 29 increases and transistor 30 remains conductive. It will of course be appreciated that transistor 31 could be normally conductive and transistor 30 normally non-conductive, and detection signified by transistor 30 becoming conductive and transistor 31 non-conductive.

Figure 6:
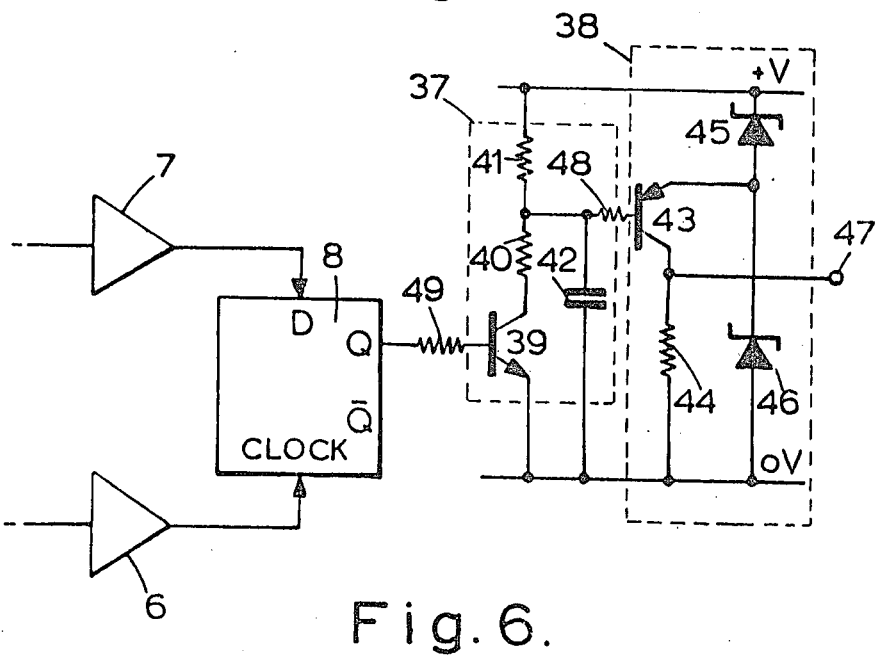
FIG. 6 is a simplified circuit diagram of another form of target sensing circuit for the system of FIG. 1.

The target sensing circuit shown in FIG. 6 comprises a storage element 37 and a threshold element 38. The element 37 comprises a transistor 39, the base of which is fed with the phase detector output signal 11, a resistor 49 limiting the current to a safe value. The collector of the transistor 39 is connected to a positive supply line +V via two series connected resistors 40 and 41. A capacitor 42 is connected between the junction of the resistors 40 and 41 and a return supply line OV, the emitter of transistor 39 being also connected to this latter supply line. When the output signal 11 has a high level, the transistor 39 is conductive and the capacitor 42 loses charge through resistor 40 and transistor 39. When the output signal 11 has a low level, the transistor 39 is non-conductive and the capacitor 42 gains charge through resistor 41. By making the RC time constant of resistor 40 and capacitor 42 very short compared with the RC time constant of resistor 41 and capacitor 42, the resultant charge on the capacitor 42 will increase from a low level to a higher level in response to signal 11 going to a low level to signify a possible approaching target. The rate of voltae change is determined principally by the RC time constant of resistor 41 and capacitor 42, this time constant being chosen, as previously explained, having regard to the expected noise-to-noise correlation time in the system. Thus, in the absence of the beat signals 3 and 4, the resultant charge on the capacitance 42 due to noise signals is unlikely to rise sufficiently to reach a threshold value at which the threshold element 38 becomes responsive if the time constants have been correctly chosen. When the beat signals 3 and 4 occur, they will cause changes in the amplifier output signals by lifting the noise up in some places and lowering it in others with the result that the amount of time that the output signal 11 is at the high level increase or decrease according to the relative phases of the beat signals 3 and 4. If there is an increase in this time, which in this instance is indicative of a receding target, there will be only a small change in the resultant charge on the capacitor 42 and such change will be in the direction of reduced charge, whereas if there is a decrease in this time, which is indicative of an approaching target, the resultant charge on the capacitor 42 will increase towards the threshold value due to the reduced flow of current through resistor 40. It this latter time is sufficiently prolonged, the threshold value will be reached. If it is not, the resultant charge on the capacitor 42 will quickly restore to the quiescent value ready for the next change in the output signal level in a direction indicative of a possible approaching target.

The threshold element 38 comprises a transistor 43 having its base connected to the capacitor 42, its collector connected via a resistor 44 to the supply line OV and its emitter connected to the junction of two zener diodes 45 and 46 which are connected between the voltage supply lines +V/OV and clamp the emitter voltage typically to about one half the supply voltage. By making the voltage across the capacitor 42 less than the voltage at the emitter of transistor 43 by an amount of at least 0.6 volts for a silicon transistor (i.e. by the Vbe of the transistor) the transistor 43 is held conductive. However, when the resultant charge on the capacitor 42 attains the threshold level, transistor 43 is rendered non-conductive since the voltage of its base is now not more negative than its emitter voltage, and the loss of voltage at the collector of transistor 43 appears at an output terminal 47 to signify the detection of an approaching target. As in the case of the target sensing circuit of FIG. 5, the circuit is arranged so that no indication is produced for a receding target, and thus the circuit of FIG. 6 is also suitable for use when the system is for traffic signal control.

Preferably, the phase detector (8 - FIG. 1) of the system is a D-type edge-triggered flip-flop having a clock input to which one of the amplifier output signals is applied, a D input to which the other of the amplifier output signals is applied, and complementary Q and Q̄ outputs. Because the target sensing circuit of FIGS. 5 and 6 could also be made responsive in respect of a phase detector output signal which has a high level for an approaching target instead of a phase detector output signal which has a low level for an approaching target, it will be apparent that the alternative flip-flop outputs could have been used, respectively, for these target sensing circuits.

In an application of the system where an indication of a receding target as well as an approaching target is required, this can be achieved by providing two target sensing circuits, of either form, which are connected respectively to the complementary Q and Q̄ outputs of the flip-flop. Such applications can be found in intruder alarms, capacitor 29 or 42 providing protection (i.e. non-response) against short time Doppler signals. In particular capacitor 29 and circuit will protect against back and forth movement causing an alarm.

If an actual speed indication of a target is required this can be obtained by frequency measurement of either one of the two beat signals.

In the system of FIG. 1, the elements 1, 2, 5, 6 and 7 are all of known form, so that further description of these elements is thought to be unnecessary for an understanding of the invention. A suitable D-type edge-triggered flip-flop for the phase detector 8 is the Philips type FJJ.131 or Texas Instruments SN.74 L74 both of which have positive-edge triggering.

What we claim is:

1. A Doppler radar system comprising a phase detector responsive during each beat signal cycle to produce an output signal having a first level when the two beat signals have a relative phasing within specified limits and a second level when their relative phasing has shifted outside these limits, respective amplifying means to which said beat signals are applied before application to said phase detector, said amplifying means having a gain sufficient to produce, in the absence of said beat signals, output noise signals which are due to noise in the system and which render the phase detector responsive in accordance with the relative positions of their rising and falling edges to produce its output signal with either said first or second level, storage means responsive to the phase detector output signal for storing a representative level thereof, and threshold means responsive to provide an indication of a moving target when said representative level of output signal changes from a quiescent value to a threshold value.

2. A system as claimed in claim 1, wherein the output signals from the amplifying means are passed through a non-linear circuit element which causes their average level to be different from the level which is midway between their most positive and most negative swings, whereby to "weight" the average level of the phase detector output signal or the average time that this output signal is at one or the other of its two levels.

3. A system as claimed in claim 1, wherein said storage means is an RC - network comprising a resistance through which a capacitance is arranged to be charged and discharged according as the output signal from the phase detector is at one or the other of its two possible levels, so that the capacitance acquires a resultant charge which corresponds to the average level of this output signal, this average level constituting said representative level.

4. A system as claimed in claim 3, wherein said threshold means is comprised by a differential transistor pair of which one transistor has its base connected to receive a reference voltage corresponding to said threshold value, while the other transistor has its base connected to receive the voltage across said capacitance due to the charge thereon, the conductive states of these two transistors being altered to provide an output signal indicative of target movement when the voltage across the capacitance has a value signifying said threshold value.

5. A system as claimed in claim 1, wherein said storage means comprises a capacitance and unidirectional current path means permitting the capacitance to be discharged at a relatively high rate when the phase detector output signal is at one of its two possible levels, together with a resistance which provides for the capacitance a charge path through which, when the phase detector output signal is at its other level, said unidirectional current path means permits the capacitance to acquire charge at a relatively slower rate, the resultant average charge on the capacitance corresponding to said one level which constitutes said representative level.

6. A system as claimed in claim 5, wherein said unidirectional current path means is a transistor.

7. A system as claimed in claim 5, wherein said threshold means is comprised by a transistor having its emitter connected to receive a reference voltage corresponding to said quiescent value, and its base connected to receive the voltage across the capacitance due to the charge thereon, the transistor being rendered either conductive or non-conductive to provide an output signal indicative of target movement when the voltage across the capacitance has a value signifying said threshold value.

8. A system as claimed in claim 1, wherein the two beat signals have a nominal 90° phase relationship and the phase detector means has a clock input to which one of said amplifier output signals is applied and a second input to which the other of said amplifier output signals is applied, the phase detector means being so arranged that each time the amplifier output signal at its clock input attains a triggering level, it produces an output signal having either said first or said second level according as the amplifier output signal at its second input has an upper or lower level and maintains that output signal level until the amplifier output signal at is clock input next attains said triggering level, which next triggering level will cause the output signal level to change only if there is now a change in the level of the amplifier output signal at said second input.

9. A system as claimed in claim 8 wherein said phase detector means is a D-type edge-triggered flip-flop having a clock input, a D input, which is said second input, and complementary Q and Q outputs.

* * * * *

UNITED STATES PATENT AND TRADEMARK OFFICE
CERTIFICATE OF CORRECTION

PATENT NO. : 4,053,887
DATED : October 11, 1977
INVENTOR(S) : KENNETH HOLFORD

It is certified that error appears in the above—identified patent and that said Letters Patent are hereby corrected as shown below:

Column 3, line 68, "Q and Q" should be --Q and $\overline{Q}$--

Column 8, lines 7 and 20, "Q and Q" should be --Q and $\overline{Q}$--

Claim 9, line 4, "Q and Q" should be --Q and $\overline{Q}$--

Signed and Sealed this

Twenty-fifth Day of April 1978

[SEAL]

Attest:

RUTH C. MASON
Attesting Officer

LUTRELLE F. PARKER
Acting Commissioner of Patents and Trademarks